Jan. 19, 1932.   P. B. CAMP   1,841,573
HAND BRAKE MECHANISM
Filed Oct. 7, 1929   2 Sheets-Sheet 1
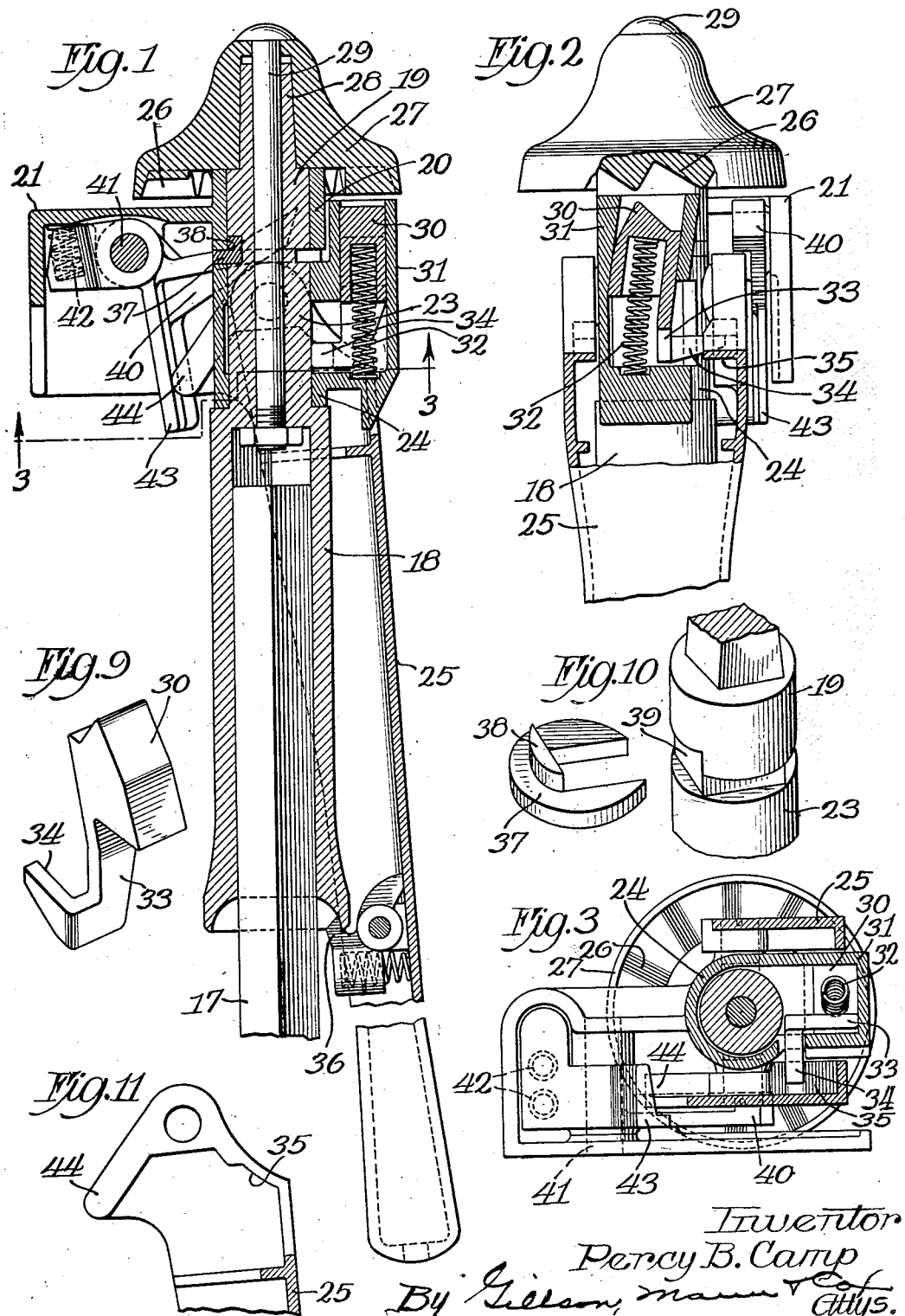

Jan. 19, 1932.  P. B. CAMP  1,841,573
HAND BRAKE MECHANISM
Filed Oct. 7, 1929    2 Sheets-Sheet 2
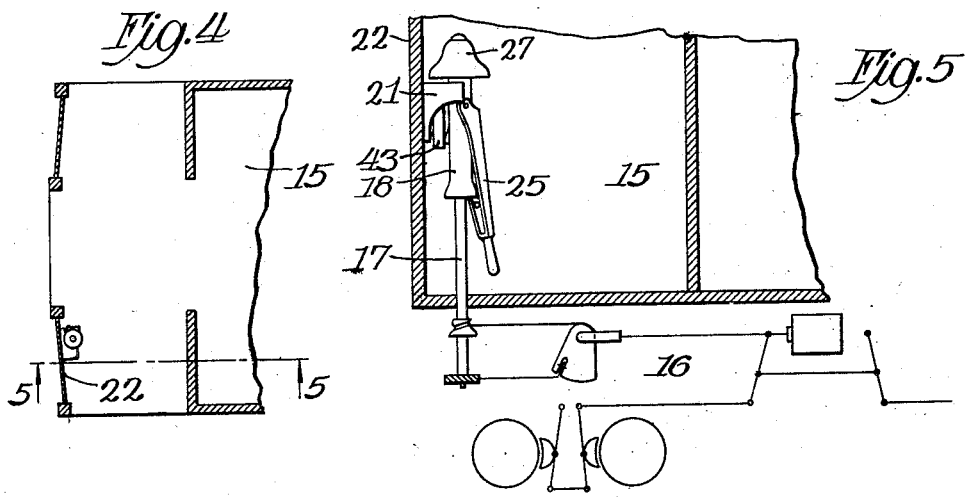
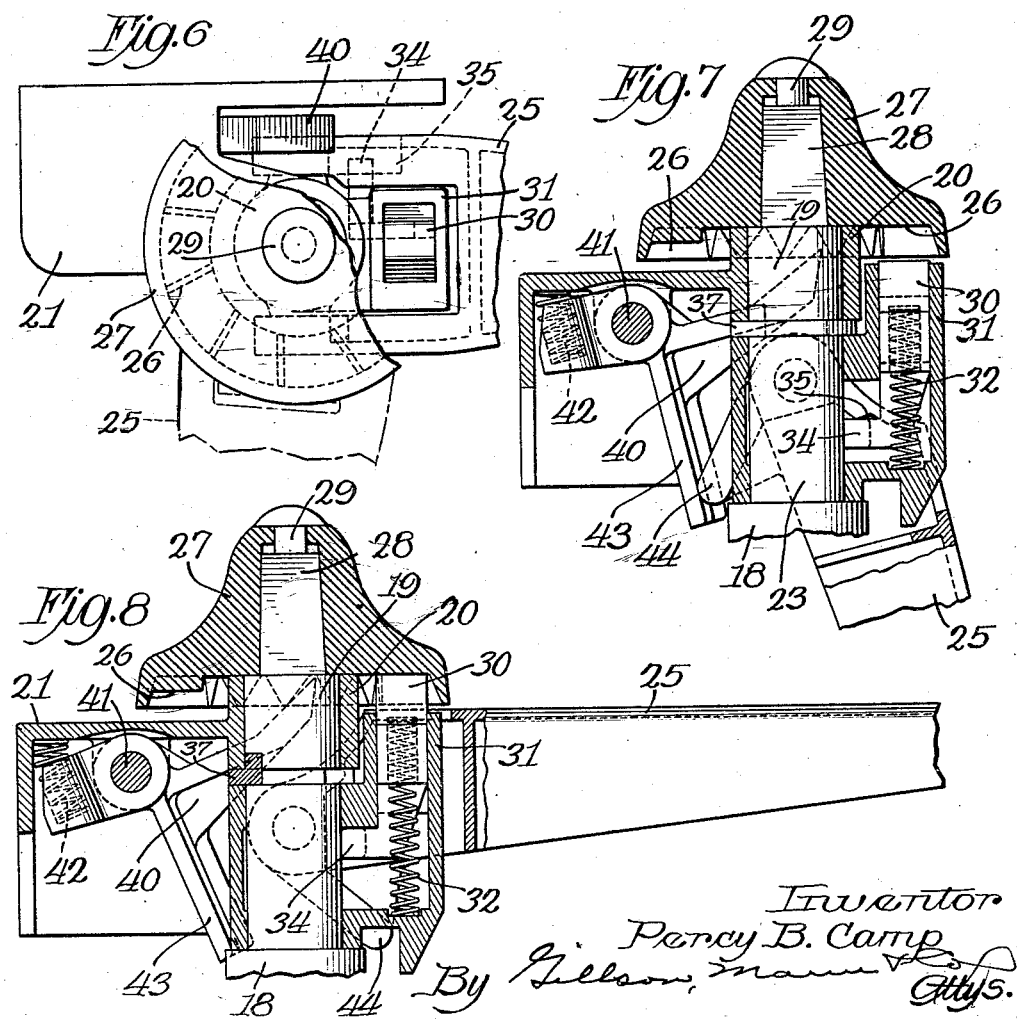
Inventor
Percy B. Camp Patented Jan. 19, 1932

1,841,573

UNITED STATES PATENT OFFICE

PERCY B. CAMP, OF MAYWOOD, ILLINOIS, ASSIGNOR TO UNIVERSAL DRAFT GEAR ATTACHMENT CO., A CORPORATION OF ILLINOIS

HAND BRAKE MECHANISM

Application filed October 7, 1929. Serial No. 397,799.

The invention relates to hand brake mechanism of the drop handle type, its object being to secure simplicity of construction and reliability of action, and to provide controlling mechanism which may be readily applied to existing brake staffs.

A preferred embodiment of the invention is hereinafter described, and is illustrated in the accompanying drawings, in which Fig. 1 is a vertical central section of the controlling mechanism, a detail of the brake staff being shown in elevation;

Fig. 2 is a detail, partly in section, of the handle and ratchet mechanism;

Fig. 3 is a section on the line 3—3 of Fig. 1;

Fig. 4 is a detail plan section of a railway car showing the position of the brake thereon;

Fig. 5 is a detail section on the line 5—5 of Fig. 4;

Fig. 6 is a detail plan view of the brake mechanism, some parts being broken away to show internal construction;

Fig. 7 is a sectional view of a portion of the mechanism as shown in Fig. 1, certain parts being differently positioned;

Fig. 8 is a detail section on the same plane as Figs. 1 and 7, the parts being in service position; and Figs. 9, 10 and 11 are details of various parts of the mechanism.

For the purpose of illustration the invention is shown in connection with a passenger car 15, and with brake mechanism 16 of the so-called "booster" type. A brake staff of ordinary form is shown at 17, and upon the upper end thereof is non-rotatably mounted a sleeve 18. For the purpose of illustration the brake staff is shown as polygonal in form, the sleeve, of course, being of complementary form. Should the brake staff to which the device is applied be of different shape in cross-section, the sleeve will be adapted to fit it, and if necessary special interlocking devices may be applied to prevent the relative rotation of these two parts.

The sleeve is prolonged upwardly in the form of a shaft, the upper portion, 19, of which is journaled in a box 20, forming a part of a bracket 21 adapted for fixed attachment to a wall, as 22. The lower section, 23, of the shaft portion of the sleeve constitutes a bearing for a rotatable head 24, to which is pivotally attached a drop handle 25.

A ratchet 26 is formed on the lower face of a wheel 27 on the upper end of the sleeve extension. Preferably, as shown, this wheel is a separate element fixed upon a reduced upper end 28 of the sleeve, and secured to the sleeve by any suitable means, such as a bolt 29, extending downwardly through the wheel and the shaft extension of the sleeve, and into the chamber thereof which receives the staff 17, a nut being applied to the lower end of the bolt. The upper face of the wheel 27 is preferably dome-shaped to avoid angular projections which might result in injury to the operator.

A reciprocating pawl 30, housed in an upwardly opening pocket in a lateral extension 31 of the head 24, cooperates with the ratchet 26 and is normally held in engagement therewith by means of a spring 32. The pawl 30 is provided with a stem 33 having a lateral lug 34 which projects into the chambered end of the handle 25 for engagement by a cam face 35 formed on the handle, such engagement occurring as the handle approaches the vertical position shown in Fig. 1,—the pawl being thereby withdrawn from engagement with the ratchet 26 against the resistance of the spring 32.

The handle 25 is yieldingly locked in the lowered position by a spring latch 36, carried by it and automatically engageable under the lower end of the sleeve 18. Preferably a wear plate 37 is interposed between the upper end of the eye of the head 24 and the lower margin of the box 20. For convenience in applying this plate, it is given a substantially horse-shoe shape and fitted upon a reduced portion of the sleeve extension between the two shaft sections 19 and 23 thereof. This plate overcomes any tendency of the head 24 to rise and bind against the bracket eye which will ordinarily be made of the same metal.

Within the bow of the horse-shoe, there is formed an upstanding lug 38, and the shaft section 19 is cut away, as shown at 39, to accommodate it.

A holding pawl 40 is pivoted at 41 to the bracket 21, and is normally held in engagement with the ratchet teeth 26 by means of a spring 42. This pawl is provided with an extension 43 for engagement by a lug 44 on the handle 25, when the latter is dropped, such engagement, however, not occurring until the pawl 30 has been disengaged from the ratchet 26. The release of the pawl 40 permits the withdrawal of the brakes. This release occurs only when the head 24 is turned to a certain position, thus rendering it possible to drop the handle without releasing the brakes.

As indicated in Fig. 7, the complete release of the holding pawl 40 does not occur until the handle 25 has completed its down stroke, as indicated in Fig. 1.

The invention is capable of embodiment in other forms within the scope of the appended claims.

I claim as my invention—

1. In a hand brake mechanism, in combination, a brake staff, a relatively non-rotatable sleeve fitting upon the staff and having a downwardly facing annular ratchet at its upper end, a bracket in which the sleeve is journaled, a head rotatably mounted on the sleeve, a spring-advanced reciprocating pawl carried by the head and cooperating with the ratchet, a drop handle attached to the head and engageable with the pawl to move it in opposition to the spring as the handle is lowered.

2. In a hand brake mechanism, in combination, a staff, a drop handle carried by the staff, and means for automatically locking such elements together when the handle is in its lowered position.

3. In a hand brake mechanism, in combination, a staff, a sleeve mounted thereon and having an outstanding skirt at its lower end, a drop handle, and a spring latch carried by the handle and engageable with the skirt when the handle is in its lowered position.

4. In a hand brake mechanism, in combination, a rotatable vertical shaft, an annular downwardly facing ratchet wheel fixed to the shaft, a head rotatably mounted on the shaft, a vertically sliding spring-advanced pawl carried by the head and engageable with the ratchet, a drop handle pivotally mounted on the head and having withdrawing engagement with the pawl as it swings to vertical position.

5. In a hand brake mechanism, in combination, a staff, a head fixed upon the staff and having an annular ratchet on its lower face, a head rotatably mounted on the staff, a vertically movable spring-advanced pawl carried by the head and engageable by the ratchet, an arm projecting laterally from the pawl, and a handle pivotally mounted on the head for vertical oscillation and having a portion engageable with the arm as the handle moves downwardly for withdrawing the pawl in opposition to its spring.

In testimony whereof I affix my signature.

PERCY B. CAMP.